United States Patent
Howie, Jr.

(12) 
(10) Patent No.: US 6,896,442 B1
(45) Date of Patent: May 24, 2005

(54) KNOB WITH FINGERS FOR GRIPPING A SHAFT

(75) Inventor: Robert K. Howie, Jr., Decatur, IL (US)

(73) Assignee: The Grigoleit Company, Decatur, IL (US)

( * ) Notice: Subject to any disclaimer, the term of this patent is extended or adjusted under 35 U.S.C. 154(b) by 62 days.

(21) Appl. No.: 10/306,461

(22) Filed: Nov. 27, 2002

(51) Int. Cl.[7] ............................... F16D 3/06
(52) U.S. Cl. ................... 403/359.1; 403/282
(58) Field of Search .............. 403/282, 279, 403/329, 359.1, 359.2

(56) References Cited

U.S. PATENT DOCUMENTS

| | | | | |
|---|---|---|---|---|
| 4,657,428 A | * | 4/1987 | Wiley | 403/359.3 |
| 5,509,174 A | * | 4/1996 | Worrell | 16/441 |
| 6,086,284 A | * | 7/2000 | Callahan | 403/93 |
| 6,557,433 B1 | * | 5/2003 | Castellon | 403/359.1 |
| 6,561,912 B1 | * | 5/2003 | Link | 403/345 |
| 6,648,195 B2 | * | 11/2003 | Morris et al. | 403/396 |

* cited by examiner

*Primary Examiner*—John R. Cottingham
(74) *Attorney, Agent, or Firm*—Cook, Alex, McFarron, Manzo, Cummings & Mehler, Ltd.

(57) ABSTRACT

A knob for installation on circular and non-circular shafts. The knob includes a hub molded of a thermoplastic material. An elongated socket is formed in the hub and has a transverse cross-section which is complimentary to that of the shaft. Flexible fingers of Y-shaped cross-section are formed in the socket integral with the walls of the socket and spaced from one another around the socket. The flexible fingers extend the length of the socket and are relieved adjacent the shaft receiving entrance to the socket. In a modification, a skirt surrounds the hub and extends outwardly of the socket and the flexible fingers extend outwardly beyond the socket. In another modification, ribs are formed between the fingers.

12 Claims, 4 Drawing Sheets

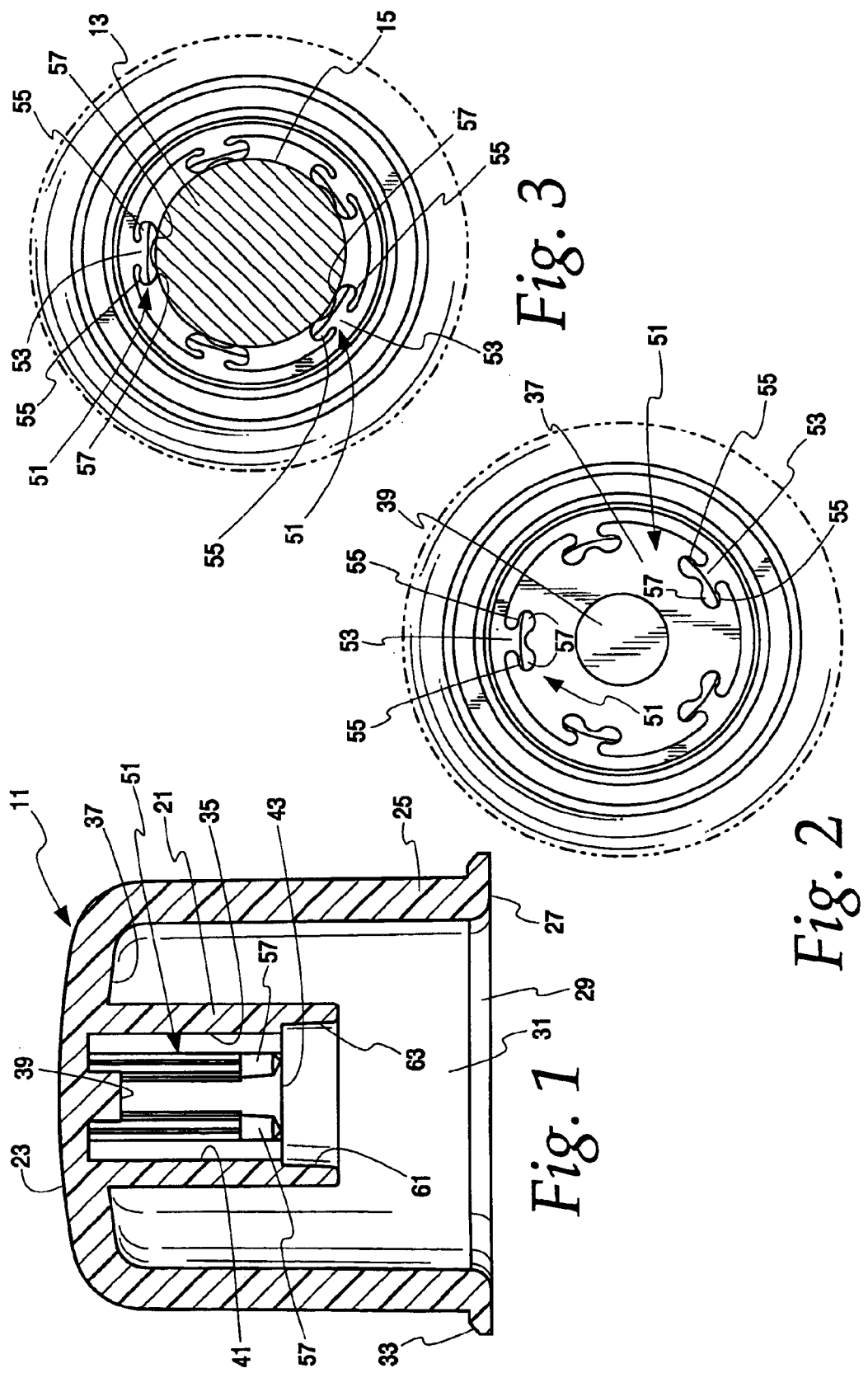

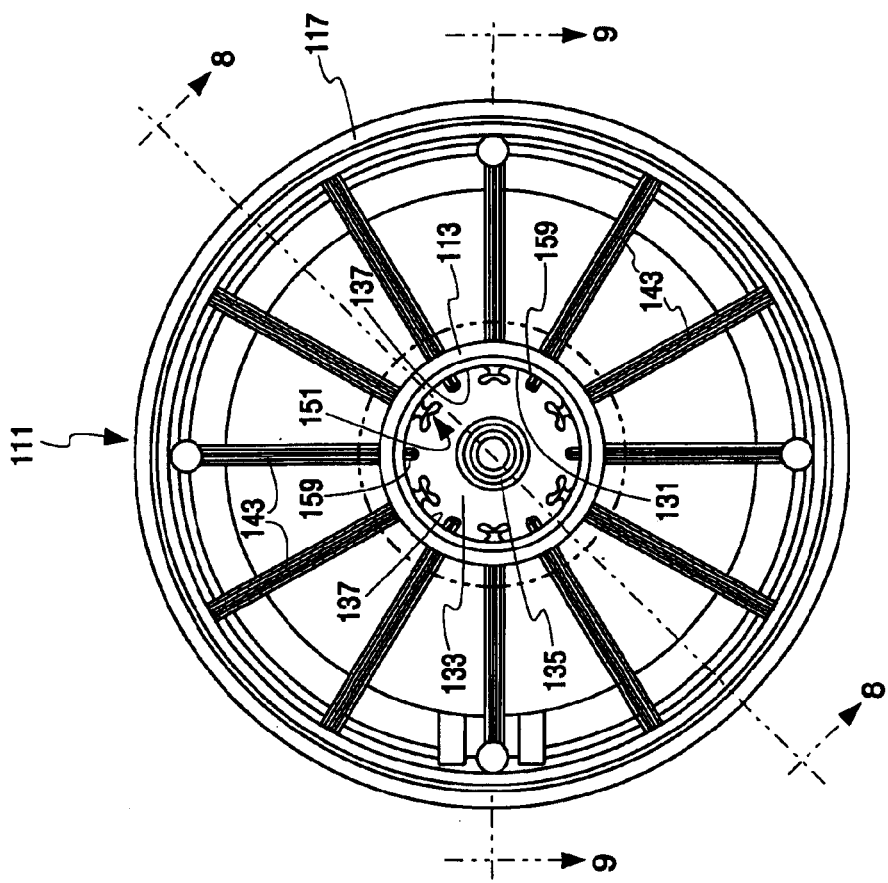
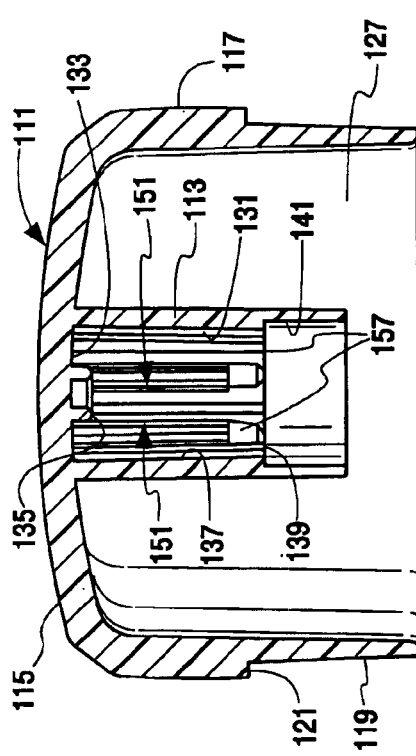
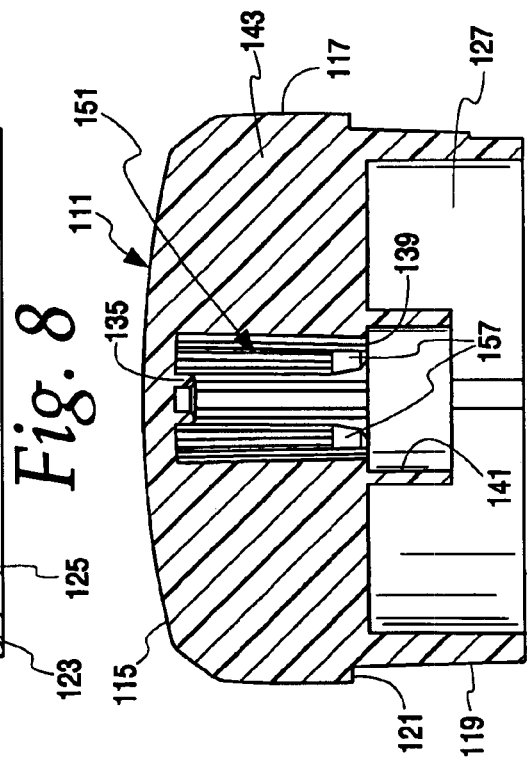

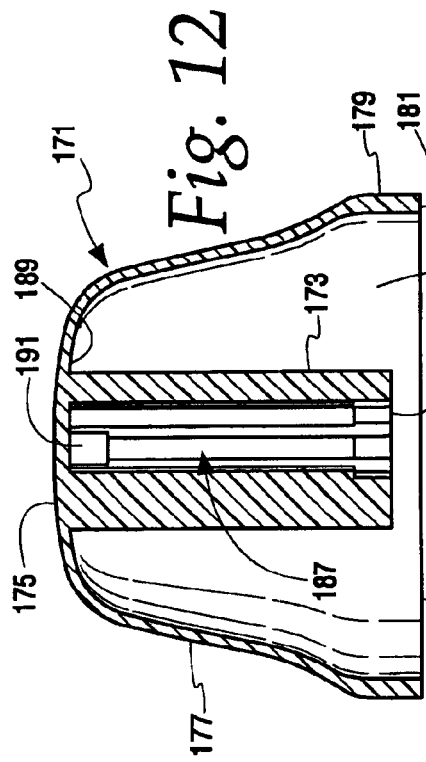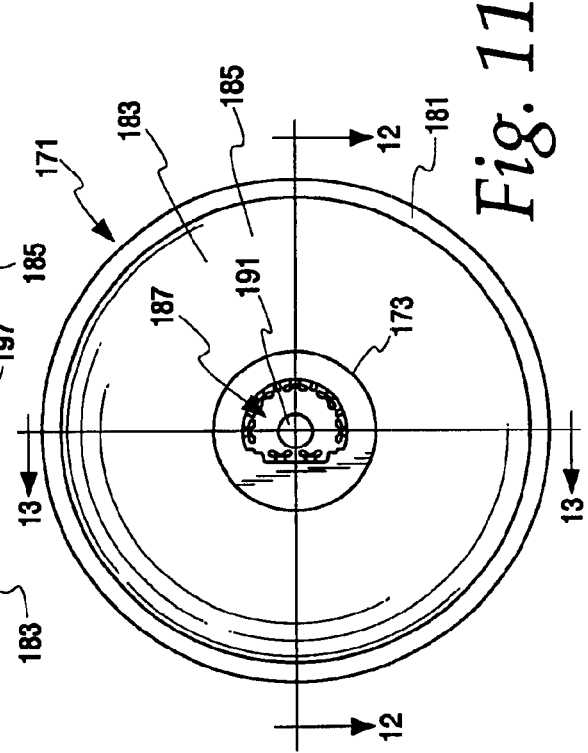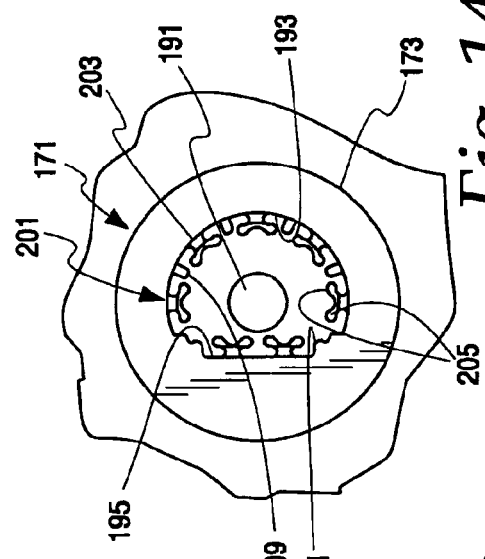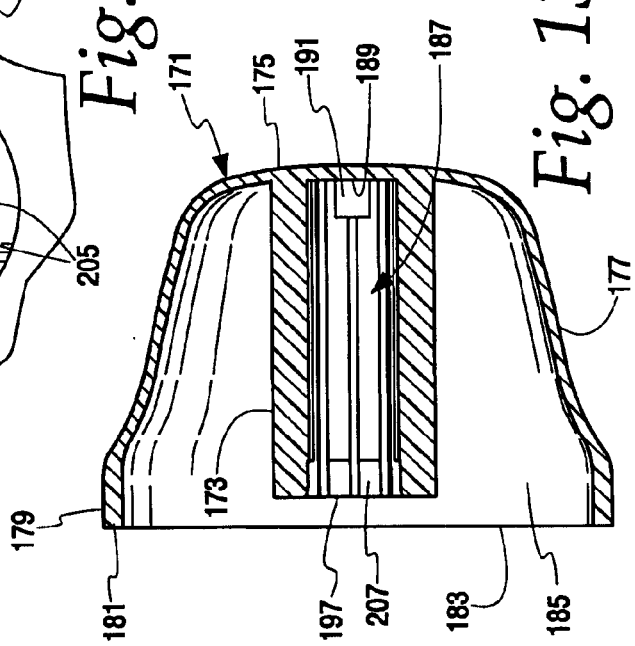

US 6,896,442 B1

KNOB WITH FINGERS FOR GRIPPING A SHAFT

BACKGROUND AND SUMMARY OF THE INVENTION

The molded knobs of this invention are of the type intended to be installed on shafts of both circular and non-circular transverse cross-sections.

One embodiment of this invention is directed to a friction fit knob having resilient, flexible gripping fingers which can securely grip a shaft of circular transverse cross-section to permit turning of the knob to rotate the shaft without slippage of the knob on the shaft and without the necessity of providing a flat section on the shaft.

Another embodiment of this invention is directed to a friction fit knob for a shaft having an arcuate surface and a flat surface.

An object of this invention is a friction fit knob having resilient, flexible gripping fingers spaced around the inner wall of the knob socket and positioned to engage an outer surface of the shaft which improves the anti-slip engagement of the knob with the shaft.

Another object of this invention is a friction fit knob having resilient, flexible gripping fingers which can grip a shaft of fully circular transverse cross-section thereby avoiding the orientation problems inherent with the installation of knobs on shafts which are non-circular in transverse cross-section or have a flattened section.

Yet another object of this invention are resilient, flexible shaft gripping fingers which allow a knob to pilot on the shaft to which it is being applied before the gripping fingers are engaged by the shaft to avoid damaging the gripping fingers during installation.

Still another object of this invention is a friction fit knob having resilient, flexible shaft gripping fingers which apply gripping pressure around the entire periphery of the shaft.

Other objects of the invention will be found in the following specification, claims and drawings.

BRIEF DESCRIPTION OF THE DRAWINGS

The invention is illustrated more or less diagrammatically in the following drawings wherein:

FIG. 1 is a longitudinal cross-sectional view of a first embodiment of a knob of this invention;

FIG. 2 is an enlarged bottom plan view of the knob of FIG. 1 with parts other than the core omitted or shown in phantom lines;

FIG. 3 is a view similar to FIG. 2 but showing a shaft of circular transverse cross-section seated in the socket of the knob;

FIG. 7 is an enlarged bottom plan view of a third embodiment of a knob of this invention;

FIG. 8 is a cross-sectional view on a reduced scale taken along line 8—8 of FIG. 7;

FIG. 9 is a cross-sectional view on a reduced scale taken along line 9—9 of FIG. 7.

FIG. 11 is an enlarged bottom view of a fourth embodiment of a knob of this invention;

FIG. 12 is a cross-sectional view taken along line 12—12 of FIG. 11;

FIG. 13 is a cross-sectional view taken along line 13—13 of FIG. 11; and

FIG. 14 is an enlarged bottom plan view of the knob of FIG. 11 with portions omitted.

DESCRIPTION OF THE PREFERRED EMBODIMENTS

Figure 6:
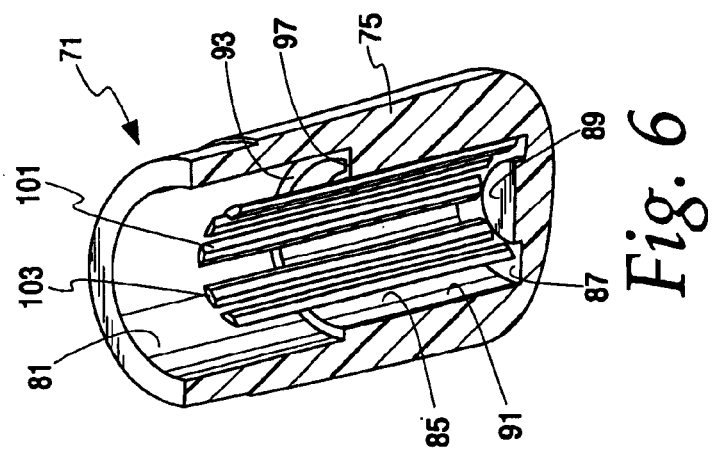
FIG. 6 is an isometric view of a longitudinally extending cross-section of the knob of FIG. 4.

FIGS. 1–3 of the drawings show a first embodiment of a molded knob 11 of this invention which is adapted to fit over a circular shaft 13 which has a circular outer surface 15, which shaft is often formed of metal. The invention is adaptable to many types of knobs and while a few will be shown and described in this specification, it should be understood and appreciated that the invention is usable with many other types of knobs in addition to those specifically described herein. The knob 11 includes a hub 21, a front enclosing wall 23 and a tubular outer wall 25. The tubular outer wall 25 ends in a distal end edge 27 which surrounds an open end 29 leading into a chamber 31. An annular flange 33 is formed on the end edge 27.

A shaft receiving socket 35 is formed in the hub 21 with the socket having a bottom or end surface 37 at the front end closing wall 23 of the knob. A circular shaft stop 39 extends from the bottom or end surface 37 of the knob closing wall 23. The shaft receiving socket includes a cylindrical interior wall 41 with a shaft receiving entrance 43 to the socket 35.

Fingers 51 are formed inside the socket 35 and extend the length of the cylindrical interior wall 41 of the socket. As can best be seen in FIGS. 2 and 3 of the drawings, the fingers 51 connect to the wall 41 by webs 53 with ribs 55 extending outwardly on opposite sides of the webs to form the fingers 51 that are generally Y-shaped in transverse cross-section. The distal ends of the fingers near the shaft receiving entrance 43 to the socket are relieved at 57 to provide leads which allow the knob to pilot on the circular shaft 13 before the shaft engages and is held by the ribs 55 of the fingers 51.

An enlarged bore 61 is formed outwardly of the shaft receiving entrance 43 to the socket 35. The enlarged bore has a tapered circumferential wall 63 with the enlarged bore minimizing rocking of the knob on the shaft 13 when the shaft enters the enlarged bore and before engaging the fingers 51 inside the shaft receiving socket 35.

Figure 4:
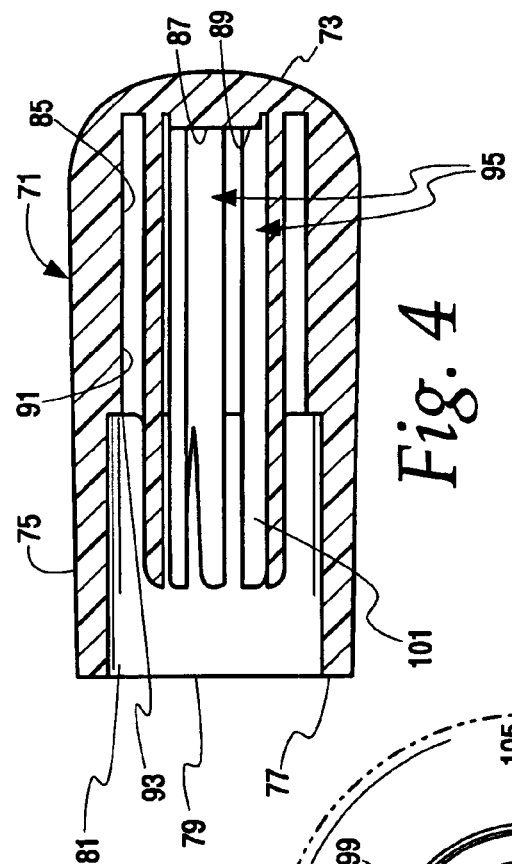
FIG. 4 is a longitudinal cross-sectional view of a second embodiment of a knob of this invention.
Figure 5:
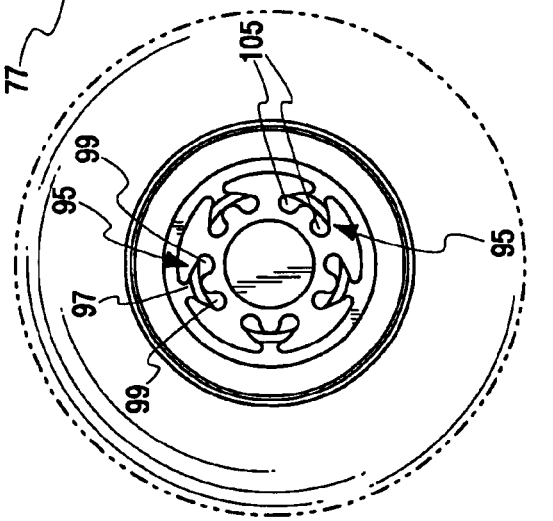
FIG. 5 is an enlarged bottom plan view the knob of FIG. 4 with parts other than the core omitted or shown in phantom lines.
Figure 10:
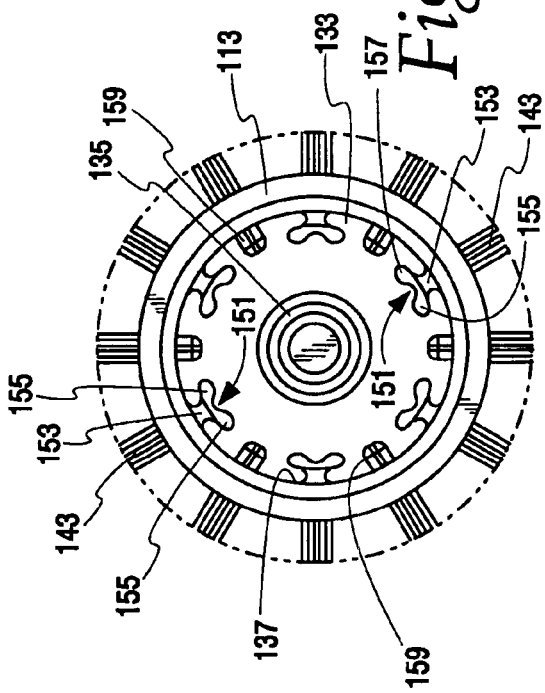
FIG. 10 is an enlarged bottom plan view of the knob of FIG. 7 with parts other than the core and portions of the ribs omitted for clarity of illustration.

A second embodiment of the invention and a variation thereof are shown in FIGS. 4, 5 and 6 of the drawings. Molded knob 71 includes a front end or closing wall 73 and a tubular outer wall 75 which terminates in an end edge 77 surrounding an open end 79 which leads into an enlarged bore 81 extending from the open end 79 of the knob. Located inwardly of the enlarged bore 81 is a shaft receiving socket 85 having a bottom surface 87 at the front closing wall 73. A circular shaft stop 89 extends longitudinally from said bottom wall 87. The shaft receiving socket has a cylindrically-shaped interior wall 91 which extends to a shaft receiving entrance 93 to the socket.

Shaft engaging fingers 95 are formed on the cylindrical interior wall 91 of the socket and each includes a web 97 formed integrally with the tubular outer wall 75 of the knob with ribs 99 extending generally outwardly of the web to form the fingers 95 of generally Y-shaped transverse cross-section as can best be seen in FIG. 5. The fingers 95 have columnar extensions 101 which extend beyond the socket 85 and into the enlarged bore 81 with the extensions having the same Y-shaped cross-sections as previously described. In FIG. 6 of the drawings, the tips 103 of the columnar extensions 101 of the fingers are flat, but in the variation of FIG. 5, the fingers are beveled at 105 to form a lead for insertion of the shaft into the socket 85. The columnar extensions 101 of the fingers 95 that extend beyond the socket 85 act as a piloting feature to assist the insertion of the circular shaft into the socket 85.

A third embodiment of the invention is shown in FIGS. 7, 8, 9 and 10 of the drawings. In the third embodiment of the invention, a molded knob 111 is formed with a hub 113, a front end enclosing wall 115, a tubular outer wall 117 and a distal skirt portion 119 of reduced thickness beginning at a shoulder 121 of the tubular outer wall. The skirt portion 119 has an end edge 123 defining an open end 125 leading into a knob chamber 127. A shaft receiving socket 131 is formed in the hub 113 and has a bottom or end surface 133 at the front end enclosing wall 115 of the knob. An annular shaft stop 135 extends from the bottom surface 133. The shaft receiving socket has a cylindrical interior wall 137 which extends to a shaft receiving entrance 139 to the socket. An enlarged bore 141 is formed in the hub outwardly of the shaft receiving entrance 139. Webs 143 extend between hub 113 and the generally tubular outer wall 117 of the knob.

Fingers 151 are formed integrally with the cylindrical interior wall 137 of the socket and project diametrically inwardly of the socket while extending the length of the cylindrical interior wall 137 of the socket from the bottom surface 133 to the shaft receiving entrance 139. As can be seen more clearly in the enlarged partial view of FIG. 10, each finger is Y-shaped in transverse cross-section and includes a web 153 formed integrally with the hub 113 and have ribs 155 extending generally outwardly on opposite sides of the web to form the Y-shaped fingers.

The distal ends of the fingers 151 near the shaft receiving entrance 139 to the socket 131 are relieved at 157 to allow the knob to pilot on the circular shaft before the shaft engages the fingers. The enlarged bore 141 engages the circular shaft before it contacts the fingers 151 to minimize rocking of the knob on the shaft during installation. Ribs 159 are formed on the cylindrical inner wall 137 of the shaft receiving socket 131 and are located between the fingers 151. The ribs project radially inwardly to assist the fingers 151 in centering the shaft. The ribs 159 are not relieved near the shaft receiving entrance 139 to the socket 131.

A fourth embodiment of the invention is shown in 11, 12, 13, and 14 of the drawings. In this embodiment, a molded knob 171 is formed with a hub 173, a front end enclosing wall 175, a tubular outer wall 177, and a distal skirt portion 179 of increased thickness. The skirt portion 179 has an end edge 181 defining an open end 183 leading into a knob chamber 185. A shaft receiving socket 187 of substantially D-shaped transverse cross-section is formed in the hub 173 and has a bottom or end surface 189 at the front end enclosing wall 175 of the knob. A cylindrical shaft stop 191 extends from the bottom surface or end surface 189 of the socket. As shown most clearly in FIG. 14, the socket includes an arcuate interior wall portion 193 and a flat wall portion 195 which is recessed from the arcuate portion, both of which extend to a shaft receiving entrance 197 to the socket.

Fingers 201 are formed integrally with the interior wall portions 193 and 195 of the socket and project diametrically inwardly of the socket while extending the lengths of the interior wall portions 193 and 195 to the shaft receiving entrance 197.

As can be seen most clearly in FIG. 11 and in the enlarged partial view of FIG. 14, each finger is Y-shaped in transverse cross-section and includes a web 203 formed integrally with the hub 173. Each finger has ribs 205 extending generally laterally on opposite sides of the web to form the fingers 201 that are generally Y-shaped in transverse cross-section.

The distal ends of the fingers 201 near the shaft receiving entrance 197 are relieved at 207 to allow the knob to pilot on the shaft before the shaft engages the fingers. Ribs 209 are formed on the arcuate interior wall portion 193 and on the flat wall portion 195 of the shaft receiving socket 187 and are located between the fingers 201. The ribs 209 project inwardly to assist the fingers 201 in centering the shaft. The ribs 209 are not relieved near the shaft receiving entrance 197 to the socket 187. Notched corners 211 are provided between the arcuate interior wall 193 and the recessed flat wall portion 195. The notched corners 211 in conjunction with the ribs 205 and the ribs 209 take up torque from the shaft.

What is claimed is:

1. A knob for installation on a shaft of circular transverse cross-section, said knob including:
    a hub molded of a thermoplastic material,
    an elongated socket of circular transverse cross-section formed in said hub and defined by a circumferential wall
    said elongated socket having a shaft receiving entrance at one end and a closing wall at its opposite end, and
    a plurality of flexible fingers formed inside said socket integrally with said circumferential socket wall and located in spaced relation to one another around said circumferential wall,
    said flexible fingers extending along the length of said socket in which each of said flexible fingers is generally Y-shaped in transverse cross-section and has a web formed integrally with and extending radially inwardly from said socket wall and a pair of flexible ribs extending laterally and oppositely from said web.

2. The knob of claim 1 in which said ribs of said flexible fingers are relieved adjacent said shaft receiving entrance of said socket.

3. The knob of claim 1 further including an elongated bore formed in said hub outwardly of said shaft receiving entrance to said socket.

4. The knob of claim 3 in which said enlarged bore includes a circumferential wall and said circumferential wall is tapered inwardly towards said shaft receiving entrance of said socket.

5. The knob of claim 1 further including a circumferential skirt surrounding said hub and extending longitudinally outwardly of said shaft receiving entrance to said socket,
    said flexible fingers extending longitudinally beyond said shaft receiving entrance to said socket.

6. The knob of claim 1 further including ribs formed on said circumferential wall between said flexible fingers with said ribs projecting into said socket to assist said fingers in centering said shaft.

7. A knob for installation on a shaft having a transverse cross-section of irregular shape with at least one arcuate wall portion and at least one planar peripheral wall portion, said knob including:
    a hub molded of a thermoplastic material,
    an elongated socket of irregular transverse cross-section formed in said hub and defined by said at least one arcuate wall portion and at least one planar wall portion, said elongated socket having a shaft receiving entrance at one end and a closing wall at its opposite end, and a plurality of fingers formed inside said socket integrally with said arcuate and planar wall portions and located in spaced relation to one another around said socket, said flexible fingers being generally y-shaped in the transverse cross section extending along the length of said socket.

8. The knob of claim 7 in which each of said flexible finger have a web formed integrally with and extending radially inwardly from said socket wall and a pair of flexible ribs extending laterally from said web.

9. The knob of claim 7 in which said ribs of said flexible fingers are relieved adjacent said shaft receiving entrance of said socket.

10. The knob of claim 7 further including ribs formed on said circumferential wall between said flexible fingers with said ribs projecting into said socket to assist said fingers in centering said shaft.

11. A knob for mounting on a shaft, said knob comprising:

a hub, an elongated socket formed in said hub and having a shaft receiving entrance at one end thereof and a transverse cross-section similar to the cross-section of the shaft to be received therein, said elongated socket being defined by an interior wall, and at least one elongated flexible finger formed on said interior wall of said socket and extending along the length of said socket to engage said shaft, said at least one flexible finger having a generally Y-shaped transverse cross-section.

12. The knob of claim 11 in which said at least one flexible finger has a web formed integrally with and extending radially inwardly from said interior wall and a pair of flexible ribs extending laterally and oppositely from said web.

* * * * *